(12) United States Patent
Zhu et al.

(10) Patent No.: US 12,279,344 B2
(45) Date of Patent: Apr. 15, 2025

(54) METHOD AND APPARATUS FOR CONTROLLING LIGHT ATTRIBUTES OF LIGHTING DEVICE, AND LIGHTING SYSTEM

(71) Applicant: SAVANT TECHNOLOGIES LLC, East Cleveland, OH (US)

(72) Inventors: Ruojian Zhu, Shanghai (CN); Hao Zhou, Shanghai (CN); Chengbin Liu, Shanghai (CN); Tianci Zhou, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 205 days.

(21) Appl. No.: 18/153,846

(22) Filed: Jan. 12, 2023

(65) Prior Publication Data

US 2023/0239976 A1    Jul. 27, 2023

(30) Foreign Application Priority Data

Jan. 18, 2022   (CN) .......................... 202210055591.7

(51) Int. Cl.
| | | |
|---|---|---|
| *H05B 45/10* | (2020.01) | |
| *H05B 45/20* | (2020.01) | |
| *H05B 47/10* | (2020.01) | |
| *H05B 47/105* | (2020.01) | |
| *F21V 23/00* | (2015.01) | |
| *F21Y 115/10* | (2016.01) | |

(52) U.S. Cl.
CPC ............. *H05B 45/10* (2020.01); *H05B 45/20* (2020.01); *H05B 47/10* (2020.01); *H05B 47/105* (2020.01); *F21V 23/005* (2013.01); *F21Y 2115/10* (2016.08)

(58) Field of Classification Search
CPC ........ H05B 45/10; H05B 45/20; H05B 47/10; H05B 47/105; H05B 47/17; F21V 23/005; F21Y 2115/10; Y02B 20/40
USPC ........................................................ 315/299
See application file for complete search history.

(56) References Cited

U.S. PATENT DOCUMENTS

| | | | | |
|---|---|---|---|---|
| 6,710,553 | B2 * | 3/2004 | Logan | H05B 47/17 |
| | | | | 315/56 |
| 7,002,264 | B2 | 2/2006 | Logan | |
| 8,853,950 | B1 * | 10/2014 | Chang | H05B 47/10 |
| | | | | 315/307 |
| 9,232,602 | B2 * | 1/2016 | Yeh | H05B 45/20 |
| 9,788,373 | B1 * | 10/2017 | Chowdhury | H05B 45/395 |

(Continued)

*Primary Examiner* — Ryan Jager

(57) ABSTRACT

Provided is a method and apparatus for controlling light attributes of a lighting device, and a lighting system and includes an indicator that receives an input, and sends to a control unit, a signal for switching light attribute of the lighting device; and the control unit determines whether a first switching signal or a second switching signal from the indicator is received during a light emission period after the lighting device is powered on, and if it is determined that the first switching signal is received, switching a current light attribute to another light attribute, or if it is determined that the second switching signal is received, switching the current light attribute to a light attribute indicated by the second switching signal such that when a specific light attribute is indicated by the second switching signal, the light attribute can still be adjusted with the first switching signal.

23 Claims, 5 Drawing Sheets

(56) References Cited

U.S. PATENT DOCUMENTS

| | | | |
|---|---|---|---|
| 9,801,250 B1* | 10/2017 | Halliwell | F21V 3/00 |
| 10,433,390 B2 | 10/2019 | Halliwell | |
| 10,893,587 B2* | 1/2021 | Halliwell | F21V 19/006 |
| 11,248,752 B2* | 2/2022 | Halliwell | H05B 45/20 |
| 11,629,824 B2* | 4/2023 | Halliwell | F21K 9/232 |
| | | | 315/294 |
| 2016/0295658 A1* | 10/2016 | Chraibi | F21V 19/006 |
| 2017/0167705 A1* | 6/2017 | Jacobson | H05B 45/10 |
| 2018/0092183 A1* | 3/2018 | Halliwell | F21V 23/003 |
| 2018/0288847 A1* | 10/2018 | Halliwell | F21K 9/238 |
| 2021/0105877 A1 | 4/2021 | Halliwell | |
| 2021/0120644 A1* | 4/2021 | Halliwell | F21V 23/003 |
| 2021/0282249 A1* | 9/2021 | Huang | H05B 47/19 |
| 2022/0128200 A1* | 4/2022 | Halliwell | F21V 29/70 |

* cited by examiner

METHOD AND APPARATUS FOR CONTROLLING LIGHT ATTRIBUTES OF LIGHTING DEVICE, AND LIGHTING SYSTEM

CROSS-REFERENCE TO RELATED APPLICATIONS

This application claims the benefit of Chinese Patent Application Serial Number 202210055591.7, filed Jan. 18, 2022, which is herein incorporated by reference.

DESCRIPTION

Field of Technology

The present application relates to a method and apparatus for controlling light attributes, and more particularly, to an improved method and apparatus for controlling light attributes of a lighting device through different switches, and a lighting system comprising the apparatus.

Background

Currently, switches for controlling light attributes (for example, color temperature) of a lighting device (such as a bulb) have been developed. The switch is located on a main body of the lighting device, and by toggling the position of the switch, light emitted by the lighting device is switched between different light attributes; or the switch is located on a wall of the zone where the lighting device is mounted, and by clicking the switch, light emitted by the lighting device is switched between different light attributes. However, when the switch is located on the main body of the lighting device, it is inconvenient for a user to switch the light attributes of the lighting device which has been mounted. For example, the user needs to climb to a ceiling, so as to switch light attributes by the switch on the main body of the lighting device mounted on the ceiling. Moreover, when the switch is located outside the lighting device, rather than on the main body of the lighting device (for example, located on a wall of the zone where the lighting device is mounted), it will be inconvenient if the light attributes of a plurality of lighting devices need to be set in batches. For example, when a plurality of lighting devices which have been delivered and are to be mounted need to be set to desired light attributes, it is difficult for a manufacturer to quickly set those lighting devices to the desired light attributes; or, when a user needs to mount a plurality of lighting devices for a certain place, if desired light attributes cannot be set in batches before mounting, the light attributes of the lighting devices can only be set or switched one by one by quickly pressing switches on the wall. In addition, although currently, a lighting device having two switches for switching light attribute which are respectively located on the wall and on the main body of the lighting device has been developed, the two switches cannot be switched freely. For example, when a switch gear on the main body is at any particular light attribute gear, rather than in a specific "switching" gear, the user cannot control the light attributes by an external wall switch, thus it is still inconvenient to control the light attributes.

Therefore, there is a need for a method and apparatus for controlling light attributes of a lighting device, and a lighting system, which enable different users to conveniently control light attributes of a lighting device in different usage scenarios by means of switches on the main body of the lighting device or other switches associated with the lighting device.

SUMMARY

The present application is proposed in view of the described problems. The main purpose of the present application is to provide a method and apparatus for controlling light attributes of a lighting device, and a lighting system comprising the apparatus, so as to at least solve the technical problem in the prior art that it is difficult to conveniently control light attributes of a lighting device by using an external switch and a lamp body switch.

In order to achieve the described object, according to one aspect of the present application, an apparatus for controlling light attributes of a lighting device is provided. The apparatus for controlling light attributes of a lighting device comprises: an indicator, configured to receive an input of a user, and send, to a control unit, a signal for switching light attribute of the lighting device; and the control unit, configured to determine whether a first switching signal or a second switching signal from the indicator is received during a light emission period after the lighting device is powered on, and if it is determined that the first switching signal is received, switch a current light attribute of the lighting device to another light attribute, different from the current light attribute, in a stored light attribute table, or if it is determined that the second switching signal is received, switch the current light attribute of the lighting device to a light attribute indicated by the second switching signal; wherein when a specific light attribute is indicated by the second switching signal of the indicator, the light attribute of the lighting device can still be adjusted in accordance with the first switching signal of the indicator.

In this way, after the lighting device is powered on, no matter whether a specific light attribute is indicated for the lighting device, the current light attribute of the lighting device can be controlled to switch in response to the first switching signal or the second switching signal outputted from the indicator. Therefore, the user can conveniently control light attributes of the lighting device in different usage scenarios by means of the indicator.

Further, according to an embodiment of the present application, the indicator comprises an external switch not located on a main body of the lighting device and a lamp body switch located on the main body of the lighting device, wherein the first switching signal is outputted in response to an input of the user to the external switch, and the second switching signal is outputted in response to an input of the user to the lamp body switch.

In this way, the user can indicate switching of attributes of light emitted from the lighting device by operating the external switch at a position away from the lighting device, and can specify, by operating the lamp body switch at the lighting device, a light attribute to which the lighting device is to be switched. Further, the operations of the external switch and the lamp body switch do not affect each other.

Further, according to an embodiment of the present application, if it is determined that the first switching signal is received, switching a current light attribute of the lighting device to another light attribute, different from the current light attribute, in a stored light attribute table comprises: in response to determining that the first switching signal is received, determining, from the light attribute table, another light attribute different from the current light attribute; updating a stored previous light-emitting light attribute of the lighting device with the another light attribute; and making the lighting device emit light according to the updated previous light-emitting light attribute.

In this way, by updating the stored previous light-emitting light attribute of the lighting device in accordance with the first switching signal and making the lighting device emit light each time in accordance with the stored latest previous light-emitting light attribute, when the first switching signal of the indicator is received, the current light attribute of the lighting device can be switched to another light attribute, different from the current light attribute, in the stored light attribute table.

Further, according to an embodiment of the present application, if it is determined that the second switching signal is received, switching the current light attribute of the lighting device to a light attribute indicated by the second switching signal comprises: in response to determining that the second switching signal is received, determining a light attribute indicated by the second switching signal; updating a stored previous light attribute setting of the lamp body switch and a previous light-emitting light attribute of the lighting device with the light attribute indicated by the second switching signal; and making the lighting device emit light according to the updated previous light-emitting light attribute.

In this way, by updating both the stored previous light-emitting light attribute of the lighting device and the previous light attribute setting of the lamp body switch according to the second switching signal, and making the lighting device emit light each time according to the stored latest previous light-emitting light attribute, when the second switching signal of the indicator is received, the current light attribute of the lighting device can be switched to the light attribute indicated by the second switching signal.

Further, according to an embodiment of the present application, the control unit is further configured to: in response to the lighting device being powered on, determine whether the lamp body switch is adjusted by the user in a power-off state; if it is determined that the lamp body switch is not adjusted in the power-off state, make the lighting device emit light according to a stored previous light-emitting light attribute of the lighting device; or if it is determined that the lamp body switch is adjusted in the power-off state, make the lighting device emit light according to a light attribute indicated by the adjusted lamp body switch.

In this way, when the lamp body switch is adjusted by the user in the power-off state, by the described operation, the lighting device can emit light in accordance with the light attribute indicated by the adjusted lamp body switch when powered on.

Further, according to an embodiment of the present application, determining whether the lamp body switch is adjusted by the user in a power-off state comprises: acquiring a current light attribute setting of the lamp body switch, comparing the current light attribute setting with a stored previous light attribute setting of the lamp body switch, and if the current light attribute setting is consistent with the previous light attribute setting, determining that the lamp body switch is not adjusted in the power-off state, or if the current light attribute setting is inconsistent with the previous light attribute setting, determining that the lamp body switch is adjusted in the power-off state.

In this way, by comparing an acquired current light attribute setting of the lamp body switch with the stored previous light attribute setting, it can be determined that whether the lamp body switch is adjusted by the user in the power-off state.

Further, according to an embodiment of the present application, if it is determined that the lamp body switch is adjusted in the power-off state, making the lighting device emit light according to a light attribute indicated by the adjusted lamp body switch comprises: updating a stored previous light attribute setting of the lamp body switch and a previous light-emitting light attribute of the lighting device with the light attribute indicated by the adjusted lamp body switch, and making the lighting device emit light according to the updated previous light-emitting light attribute.

In this way, by updating both the stored previous light-emitting light attribute of the lighting device and the previous light attribute setting of the lamp body switch according to the light attribute (i.e., the current light attribute setting of the lamp body switch, which can be indicated by the second switching signal sent by the lamp body switch after the lighting device is powered on) indicated by the lamp body switch adjusted in the power-off state, and making the lighting device emit light each time according to the stored latest previous light-emitting light attribute, when the lighting device is powered on, the lighting device can emit light according to the light attribute indicated by the lamp body switch adjusted in the power-off state.

Further, according to an embodiment of the present application, the apparatus for controlling light attributes of a lighting device further comprises: a memory, configured to store a previous light attribute setting of the lamp body switch, a previous light-emitting light attribute of the lighting device and a light attribute table, wherein the light attribute table sequentially records a plurality of light attributes that can be presented by the lighting device.

In this way, the previous light attribute setting of the lamp body switch and the previous light-emitting light attribute of the lighting device can be stored and updated with the first switching signal or the second switching signal, and the lighting device emits light each time according to the stored latest previous light-emitting light attribute of the lighting device, thereby the user can control light attributes via the external switch or the lamp body switch.

Further, according to an embodiment of the present application, the external switch also controls the on/off of the lighting device, the external switch comprises a wall switch, a remote controller or a software application program, and the lamp body switch comprises a toggle switch, a touch switch, a key switch or a knob switch.

In this way, the user may remotely switch light attributes of light emitted by the lighting device by the wall switch, the remote controller, or the software application program, or may switch the light attributes at the lighting device by the toggle switch, the touch switch, the key switch, or the knob switch.

Further, according to an embodiment of the present application, the external switch is commonly used by a plurality of lighting devices, or the lighting device is controlled by a plurality of external switches.

In this way, when there are a plurality of lighting devices, each lighting device may correspond to a control unit and a lamp body switch, and the plurality of lighting devices may correspond to one external switch. Thus, the light attributes of the plurality of lighting devices can be simultaneously controlled by using one external switch. Alternatively, a single lighting device can also correspond to a plurality of external switches, thereby the light attributes of the single lighting device can be controlled by using any one of the plurality of external switches.

Further, according to an embodiment of the present application, the light attributes comprise one or more of brightness, color temperature, color, beam angle, and color rendering index.

In this way, by using the described apparatus for controlling light attributes of a lighting device, the brightness, color temperature, color, beam angle, or color rendering index, etc. of the lighting device can be switched.

Further, according to an embodiment of the present application, the another light attribute different from the current light attribute is a light attribute several light attributes before or after the current light attribute in the light attribute table.

In this way, according to a preset light attribute switching interval for the first switching signal, when the control unit receives the first switching signal, it can be determined that which light attribute in the light attribute table the current light attribute is switched to.

According to another aspect of the present application, there is provided a lighting system, the lighting system comprising: the described apparatus for controlling light attributes of a lighting device; and the lighting device, emitting light according to a light attribute controlled by the apparatus for controlling light attributes of the lighting device.

In this way, after the lighting device is powered on, no matter whether a specific light attribute is indicated for the lighting device, the lighting system can control to switch the current light attribute of the lighting device in response to the first switching signal or the second switching signal outputted from the indicator. Therefore, with the lighting system, a user can conveniently control light attributes of the lighting device in different usage scenarios by means of the indicator.

Further, according to an embodiment of the present application, the light attributes comprise color temperature and brightness, and the lighting device comprises a first LED configured to emit light at a first color temperature and a first brightness and a second LED configured to emit light at a second color temperature and a second brightness, wherein the first color temperature is different from the second color temperature, and the first brightness is different from the second brightness.

In this way, when only the first LED or the second LED of the lighting device is lit, different color temperatures and brightnesses of the lighting device can be achieved, thereby achieving adjustment of different color temperatures and brightnesses. In particular, when the first color temperature is higher than the second color temperature and the first brightness is higher than the second brightness, the brightness can be low when the color temperature of the lighting device is also low, and the brightness can be high when the color temperature is also high. In other words, the lighting device can be adjusted from low color temperature and low brightness to high color temperature and high brightness, and thus the effect of an incandescent lamp can be simulated.

Further, according to an embodiment of the present application, the light attributes comprise a plurality of color temperatures and a plurality of brightnesses, each color temperature corresponding to a plurality of brightnesses, and the plurality of brightnesses comprising a first brightness and a last brightness; when a first switching signal or a second switching signal is received, if a current brightness of the lighting device is not the last brightness, the light attribute of the lighting device is switched from a current color temperature and the current brightness to the current color temperature and a next brightness; or if the current brightness of the lighting device is the last brightness, the light attribute of the lighting device is switched from a current color temperature and the current brightness to a next color temperature and the first brightness.

In this way, by outputting the first switching signal or the second switching signal with the indicator, the user can adjust both the color temperature and the brightness of the lighting device.

According to another aspect of the present application, provided is a method for controlling light attributes of a lighting device, the light attribute of the lighting device can be switched in response to a switching signal of an indicator, and the method comprises: determining whether a first switching signal or a second switching signal from the indicator is received during a light emission period after the lighting device is powered on; if it is determined that the first switching signal is received, switching a current light attribute of the lighting device to another light attribute, different from the current light attribute, in a stored light attribute table; or if it is determined that the second switching signal is received, switching the current light attribute of the lighting device to a light attribute indicated by the second switching signal; wherein when a specific light attribute is indicated by the second switching signal of the indicator, the light attribute of the lighting device can still be adjusted in accordance with the first switching signal of the indicator.

In this way, after the lighting device is powered on, no matter whether a specific light attribute is indicated for the lighting device, the current light attribute of the lighting device can be controlled to switch in response to the first switching signal or the second switching signal outputted from the indicator. Therefore, the user can conveniently control light attributes of the lighting device in different usage scenarios by means of the indicator.

Further, according to an embodiment of the present application, if it is determined that the first switching signal is received, switching a current light attribute of the lighting device to another light attribute, different from the current light attribute, in a stored light attribute table comprises: in response to determining that the first switching signal is received, determining, from the light attribute table, another light attribute different from the current light attribute; updating a stored previous light-emitting light attribute of the lighting device with the another light attribute; and making the lighting device emit light according to the updated previous light-emitting light attribute.

In this way, by updating a stored previous light-emitting light attribute of the lighting device in accordance with the first switching signal and making the lighting device emit light each time in accordance with the stored latest previous light-emitting light attribute, when the first switching signal of the indicator is received, the current light attribute of the lighting device can be switched to another light attribute, different from the current light attribute, in the stored light attribute table.

Further, according to an embodiment of the present application, the indicator comprises an external switch not located on a main body of the lighting device and a lamp body switch located on the main body of the lighting device, wherein the first switching signal is outputted in response to an input of the user to the external switch, and the second switching signal is outputted in response to an input of the user to the lamp body switch.

In this way, the user can indicate switching of attributes of light emitted from the lighting device by operating the external switch, and can specify, by operating the lamp body switch, a light attribute to which the lighting device is to be switched. Further, the operations of the external switch and the lamp body switch do not affect each other.

Further, according to an embodiment of the present application, if it is determined that the second switching signal is received, switching the current light attribute of the lighting device to a light attribute indicated by the second switching signal comprises: in response to determining that the second switching signal is received, determining a light attribute indicated by the second switching signal; updating a stored previous light attribute setting of the lamp body switch and a previous light-emitting light attribute of the lighting device with the light attribute indicated by the second switching signal; and making the lighting device emit light according to the updated previous light-emitting light attribute.

In this way, by updating both the stored previous light-emitting light attribute of the lighting device and the previous light attribute setting of the lamp body switch according to the second switching signal, and making the lighting device emit light each time according to the stored latest previous light-emitting light attribute, when the second switching signal of the indicator is received, the current light attribute of the lighting device can be switched to the light attribute indicated by the second switching signal.

Further, according to an embodiment of the present application, the method further comprises: in response to the lighting device being powered on, determining whether the lamp body switch is adjusted by the user in a power-off state; if it is determined that the lamp body switch is not adjusted in the power-off state, making the lighting device emit light according to a stored previous light-emitting light attribute of the lighting device; or if it is determined that the lamp body switch is adjusted in the power-off state, making the lighting device emit light according to a light attribute indicated by the adjusted lamp body switch.

In this way, when the lamp body switch is adjusted by the user in the power-off state, by the described operation, the lighting device can emit light in accordance with the light attribute indicated by the adjusted lamp body switch when powered on.

Further, according to an embodiment of the present application, determining whether the lamp body switch is adjusted by the user in a power-off state comprises: acquiring a current light attribute setting of the lamp body switch, comparing the current light attribute setting with a stored previous light attribute setting of the lamp body switch, and if the current light attribute setting is consistent with the previous light attribute setting, determining that the lamp body switch is not adjusted in the power-off state, or if the current light attribute setting is inconsistent with the previous light attribute setting, determining that the lamp body switch is adjusted in the power-off state.

In this way, by comparing the acquired current light attribute setting of the lamp body switch with the stored previous light attribute setting, it can be determined that whether the lamp body switch is adjusted by the user in the power-off state.

Further, according to an embodiment of the present application, if it is determined that the lamp body switch is adjusted in the power-off state, making the lighting device emit light according to a light attribute indicated by the adjusted lamp body switch comprises: updating a stored previous light attribute setting of the lamp body switch and a previous light-emitting light attribute of the lighting device with the light attribute indicated by the adjusted lamp body switch, and making the lighting device emit light according to the updated previous light-emitting light attribute.

In this way, by updating both the stored previous light-emitting light attribute of the lighting device and the previous light attribute setting of the lamp body switch according to the light attribute (i.e., the current light attribute setting of the lamp body switch, which can be indicated by the second switching signal sent by the lamp body switch after the lighting device is powered on) indicated by the lamp body switch adjusted in the power-off state, and making the lighting device emit light each time according to the stored latest previous light-emitting light attribute, when the lighting device is powered on, the lighting device can emit light according to the light attribute indicated by the lamp body switch adjusted in the power-off state.

According to another aspect of the present application, there is provided a computer-readable storage medium with a program stored thereon which, when executed by an apparatus for controlling light attributes of a lighting device, causes the apparatus to execute the method for controlling light attributes of the lighting device.

In this way, a user can conveniently control light attributes of the lighting device in different usage scenarios by means of the indicator.

In the embodiments of the present application, there is provided a method and apparatus for controlling light attributes of a lighting device, and a lighting system. The apparatus for controlling light attributes of a lighting device comprises: an indicator, configured to receive an input of a user, and send, to a control unit, a signal for switching light attribute of the lighting device; and the control unit, configured to determine whether a first switching signal or a second switching signal from the indicator is received during a light emission period after the lighting device is powered on, and if it is determined that the first switching signal is received, switch a current light attribute of the lighting device to another light attribute, different from the current light attribute, in a stored light attribute table, or if it is determined that the second switching signal is received, switch the current light attribute of the lighting device to a light attribute indicated by the second switching signal; wherein when a specific light attribute is indicated by the second switching signal of the indicator, the light attribute of the lighting device can still be adjusted in accordance with the first switching signal of the indicator, so as to at least solve the problem in the prior art that it is difficult to conveniently control light attributes of a lighting device by flexibly using an external switch and a lamp body switch, thereby achieving the effect that in different usage scenarios, a user can conveniently control light attributes of the lighting device by selecting a switch outside the lighting device or a switch on the lamp body of the lighting device.

BRIEF DESCRIPTION OF THE DRAWINGS

The drawings of the description, constituting a part of the present application, are used for providing further understanding of the present application, and the illustrative embodiments of the present application and illustrations thereof are used to explain the present application, rather than constitute inappropriate limitation on the present application. In the drawings.

DETAILED DESCRIPTION

It is to be noted that embodiments and the features in the embodiments of the present application can be combined with each other without conflicts. Hereinafter, the present application will be described in detail with reference to the accompanying drawings in combination with the embodiments.

It is to be noted that unless otherwise indicated, all technical and scientific terms used in the present application have the same meaning as those commonly understood by one of ordinary skill in the art to which the present application belongs.

In the present application, unless specified to the contrary, the directional terms such as "upper, lower, top, and bottom" are generally used regarding the directions shown in the figures, or for the components themselves in vertical, perpendicular, or gravity directions; likewise, for ease of understanding and description, "internal, external" refer to internal and external relative to the outline of each component itself, but the described directional terms are not used to limit the present application.

An object of the present application is to provide a lighting device, so that a user can adjust light attributes of light emitted by the lighting device at any time by an input to an external switch or a lamp body switch. In other words, no matter what gear the lamp body switch is at, the user can adjust the light attributes of light emitted by the lighting device by an input to the external switch. Therefore, there is also no need to additionally provide a "switching" gear for turning on the external switch on the lamp body switch, thereby simplifying the mechanical and circuit structure of the lamp body switch, and also preventing a user from climbing to the ceiling to adjust the gear of the lamp body switch after the lighting device is mounted, thereby improving the user experience.

Figure 1:
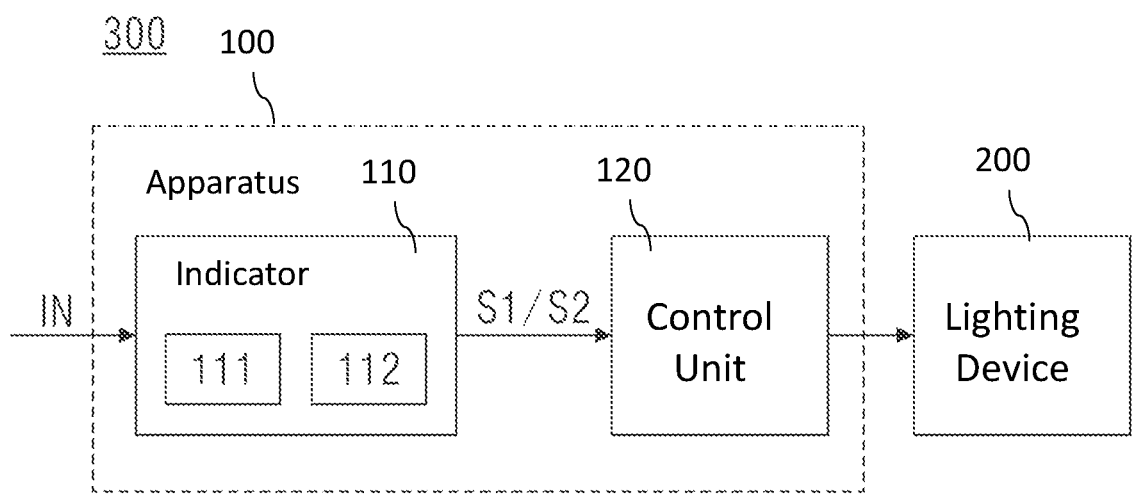
FIG. 1 illustrates a structural block diagram of an apparatus for controlling light attributes of a lighting device, and a lighting system according to embodiments of the present application.

In order to achieve the object, the present application provides an apparatus for controlling light attributes of a lighting device. FIG. 1 illustrates a structural block diagram of an apparatus for controlling light attributes of a lighting device, and a lighting system according to embodiments of the present application. As shown in FIG. 1, the apparatus 100 comprises: an indicator 110, configured to receive an input of a user, and send, to a control unit 120, a signal for switching light attribute of a lighting device 200; and the control unit 120, configured to: determine whether a first switching signal S1 or a second switching signal S2 from the indicator is received during a light emission period after the lighting device is powered on, and if it is determined that the first switching signal S1 is received, switch a current light attribute of the lighting device to another light attribute, different from the current light attribute, in a stored light attribute table, or if it is determined that the second switching signal S2 is received, switch the current light attribute of the lighting device 200 to a light attribute indicated by the second switching signal S2; wherein when a specific light attribute is indicated by the second switching signal S2 of the indicator 110, the light attribute of the lighting device 200 can still be adjusted in accordance with the first switching signal S1 of the indicator 110.

In this way, after the lighting device 200 is powered on, the current light attribute of the lighting device can be controlled to switch in response to the first switching signal or the second switching signal outputted from the indicator.

The difference between the first switching signal S1 and the second switching signal S2 lies in: the first switching signal represents switching the current light attribute of the lighting device to another light attribute, different from the current light attribute, in a stored light attribute table, and the second switching signal represents a light attribute indicated by the indicator.

In the present application, the another light attribute different from the current light attribute may be a first light attribute, a second light attribute, . . . , or a light attribute several light attributes before or after the current light attribute in the light attribute table. That is, the another light attribute may depend on the current light attribute, and light attribute switching interval and switching direction preset for the first switching signal. For example, when n light attributes (n is a positive integer) are sequentially stored in the light attribute table, if it is assumed that a light attribute switching interval is m (m is a positive integer smaller than n) and a switching direction is backwards from the current light attribute, then the another light attribute is an mth light attribute in the light attribute table backwards from the current light attribute. When the switching direction is forwards from the current light attribute, the another optical attribute may be deduced by analogy.

In the present application, for example, the lighting device 200 may be an LED light-emitting apparatus, such as an LED bulb. The control unit 120 is, for example, a micro control unit (MCU). The light attributes are parameters characterizing the characteristics of light emitted from the lighting device, including, for example, one or more of brightness, color temperature, color, beam angle, and color rendering index.

Further, in the embodiments of the present application, the indicator 110 comprises an external switch 111 and a lamp body switch 112, the first switching signal S1 is outputted in response to the input of the user to the external switch 111, and the second switching signal S2 is outputted in response to the input of the user to the lamp body switch 112.

In this way, the user can indicate switching of light attributes of light emitted by the lighting device 200 by operating the external switch 111, and can specify light attribute of light to be emitted by the lighting device 200 by operating the lamp body switch 112.

In the present application, the external switch 111 may be a remote switch that is away from the lighting device 200, and is connected to the control unit 120 in a wired or wireless connection. Specifically, the external switch 111 is, for example, a wall switch located on a wall of a zone where the lighting device 200 is mounted, or a portable remote controller, or a software application program installed in a mobile device (such as a mobile phone). In addition, the external switch 111 may also control the on/off of the lighting device 200, that is, the external switch 111 may be an existing switch device of the lighting device 200. At this time, the user can indicate the on/off of the lighting device 200 by one input (e.g., a single click), and indicate switching of light attributes by another input (e.g., quick "off/on", such as "off" and "on" operations within 3 seconds). In addition, the external switch 111 can output the first switching signal S1 only when the switch is turned on (that is, when the lighting device 200 is powered on).

In the present application, the lamp body switch 112 may be a switch embedded on the lighting device 200 (for example, embedded on a lamp body of the lighting device 200), and can be connected to the control unit 120 in a wired or wireless connection. Specifically, the lamp body switch 112 is, for example, a toggle switch, a touch switch, a key switch, or a knob switch located on a lamp body of the lighting device 200. The lamp body switch 112 may have different gears indicating different light attributes, and the user can change the gear of the lamp body switch 112 by operations such as dialing, touching, pressing, or rotating, so as to indicate a light attribute to which the lighting device 200 is to be switched.

It should be noted that when the lamp body switch 112 is a toggle switch, a key switch, or a knob switch, the lamp body switch 112 can perform light attribute switching when the lighting device 200 is powered on or off, and the second switching signal S2 is outputted after the lighting device 200 is powered on. When the lamp body switch 112 is a touch switch, the lamp body switch 112 can perform light attribute switching only when the lighting device 200 is powered on, and outputs the second switching signal S2.

Figure 2:
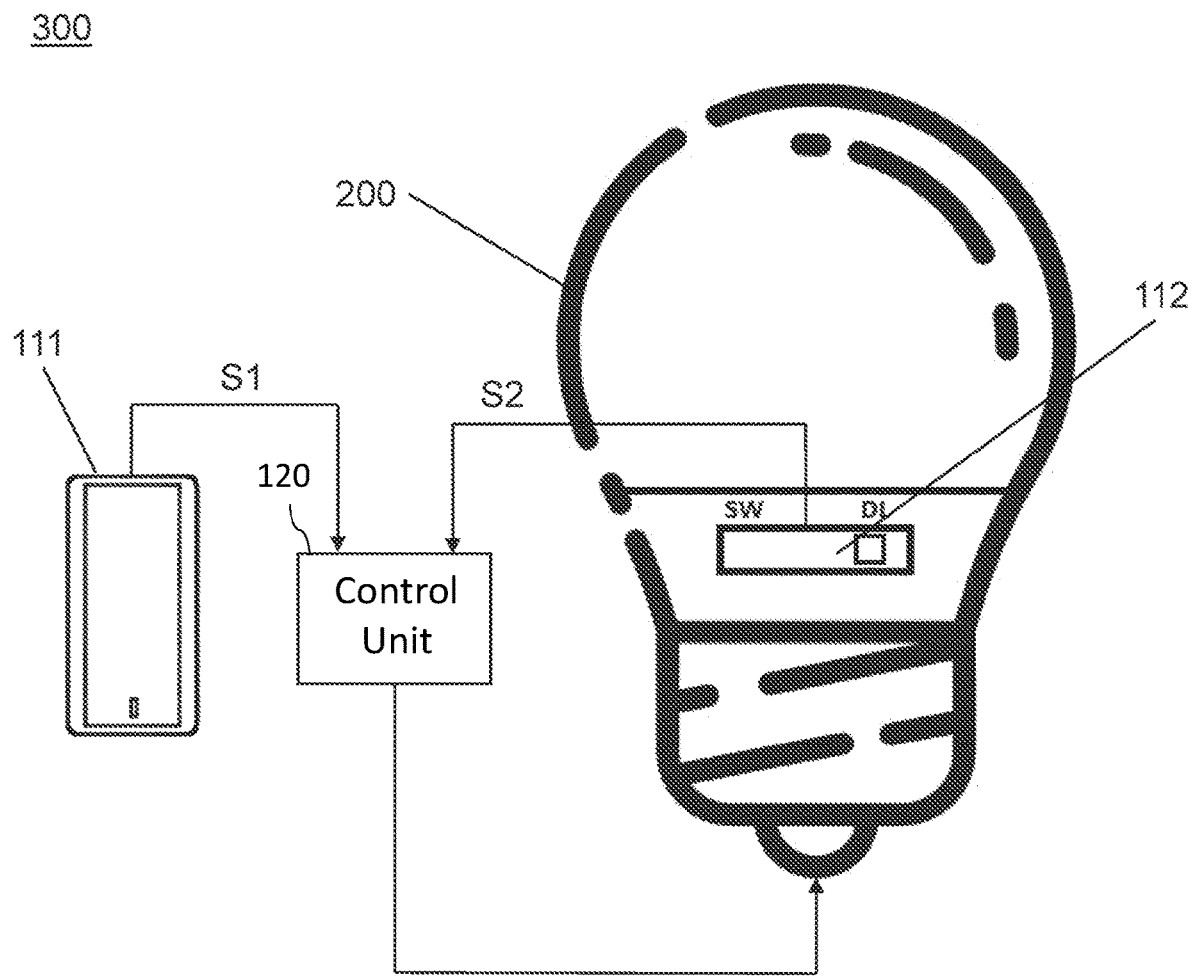
FIG. 2 illustrates a schematic diagram of arrangement of elements of an apparatus for controlling light attributes of a lighting device according to exemplary embodiments of the present application.

FIG. 2 illustrates a schematic diagram of arrangement of elements of an apparatus for controlling light attributes of a lighting device according to exemplary embodiments of the present application. As shown in the example of FIG. 2, the lighting device 200 is an LED bulb, the lamp body switch 112 is embedded in the bulb, and has gears indicating different light attributes (for example, color temperature), such as warm white (SW), daylight (DL). The user can toggle the lamp body switch 112 to adjust the gear. The external switch 111 is not located on the main body of the LED bulb, but may be provided on the wall of a zone where the LED bulb is mounted, and may instruct switching of light attributes of the LED bulb by a double-click operation of the user, etc.

Note that, in FIG. 2, the control unit 120 is illustrated as being arranged separately from the lighting device 200, but the control unit 120 and the lighting device 200 can also be arranged in the same housing. For example, the control unit 120 may be arranged inside the LED bulb, to receive the second switching signal S2 from the lamp body switch 112 in a wired connection, and to receive the first switching signal S1 from the external switch 111 in a wireless or wired connection.

Figure 4:
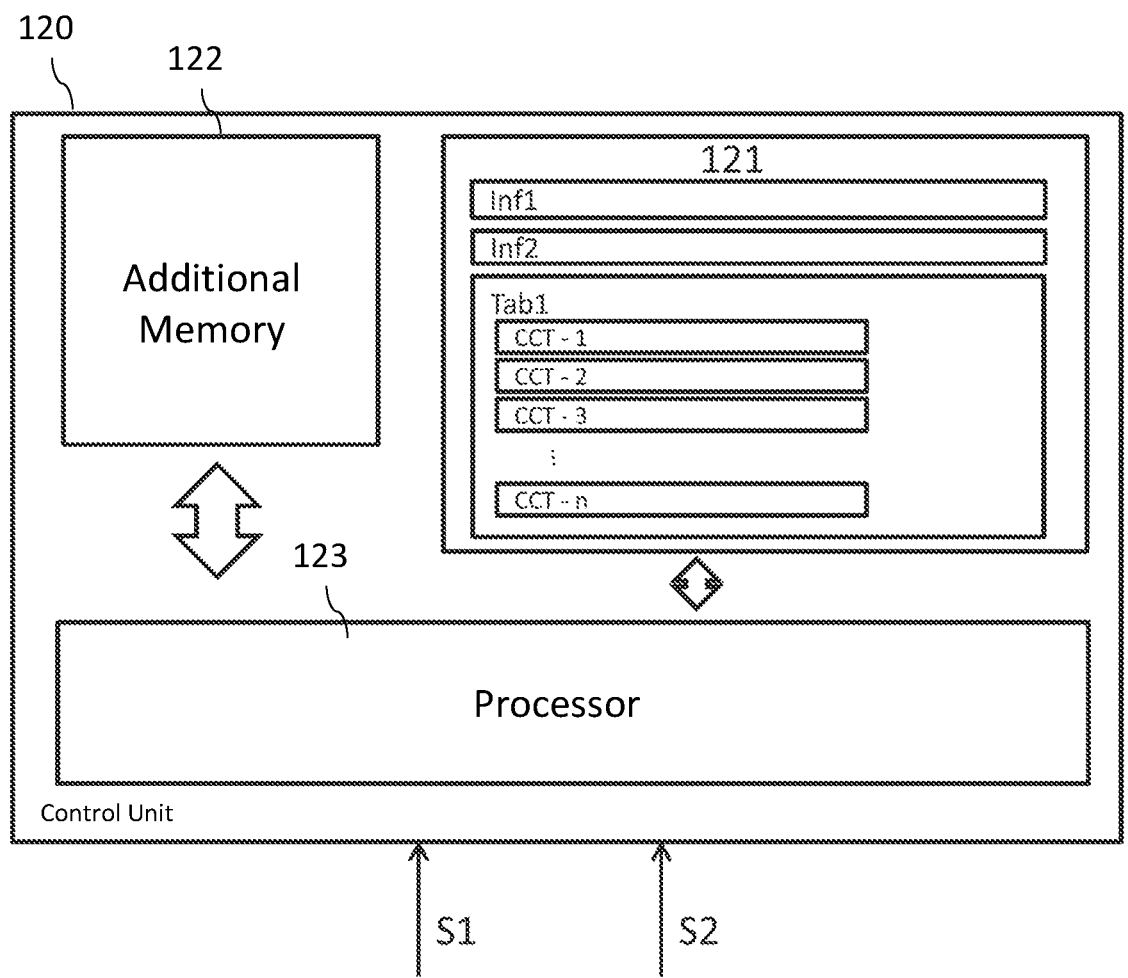
FIG. 4 illustrates a structural block diagram of a control unit of an apparatus for controlling light attributes of a lighting device according to exemplary embodiments of the present application.

Further, in the embodiments of the present application, the apparatus 100 for controlling light attributes of a lighting device further comprises a memory 121 (as shown in FIG. 4), the memory 121 being configured to store a previous light attribute setting of the lamp body switch 112, a previous light-emitting light attribute of the lighting device and a light attribute table Tab1. The memory 121 may be located inside or outside the control unit 120.

Further, in the embodiments of the present application, the control unit 120 is further configured to: in response to the lighting device being powered on, determine whether the lamp body switch 112 is adjusted by the user in a power-off state; if it is determined that the lamp body switch 112 is not adjusted in the power-off state, make the lighting device 200 emit light according to a stored previous light-emitting light attribute of the lighting device; or if it is determined that the lamp body switch 112 is adjusted in the power-off state, make the lighting device 200 emit light according to a light attribute indicated by the adjusted lamp body switch.

The external switch 111 can output the first switching signal S1 only when the lighting device 200 is powered on, but cannot output the first switching signal S1 when the lighting device 200 is powered off, and thus when the lighting device is powered on, it is only necessary to determine whether the lamp body switch 112 is adjusted by the user in the power-off state, without considering the external switch 111.

Figure 3:
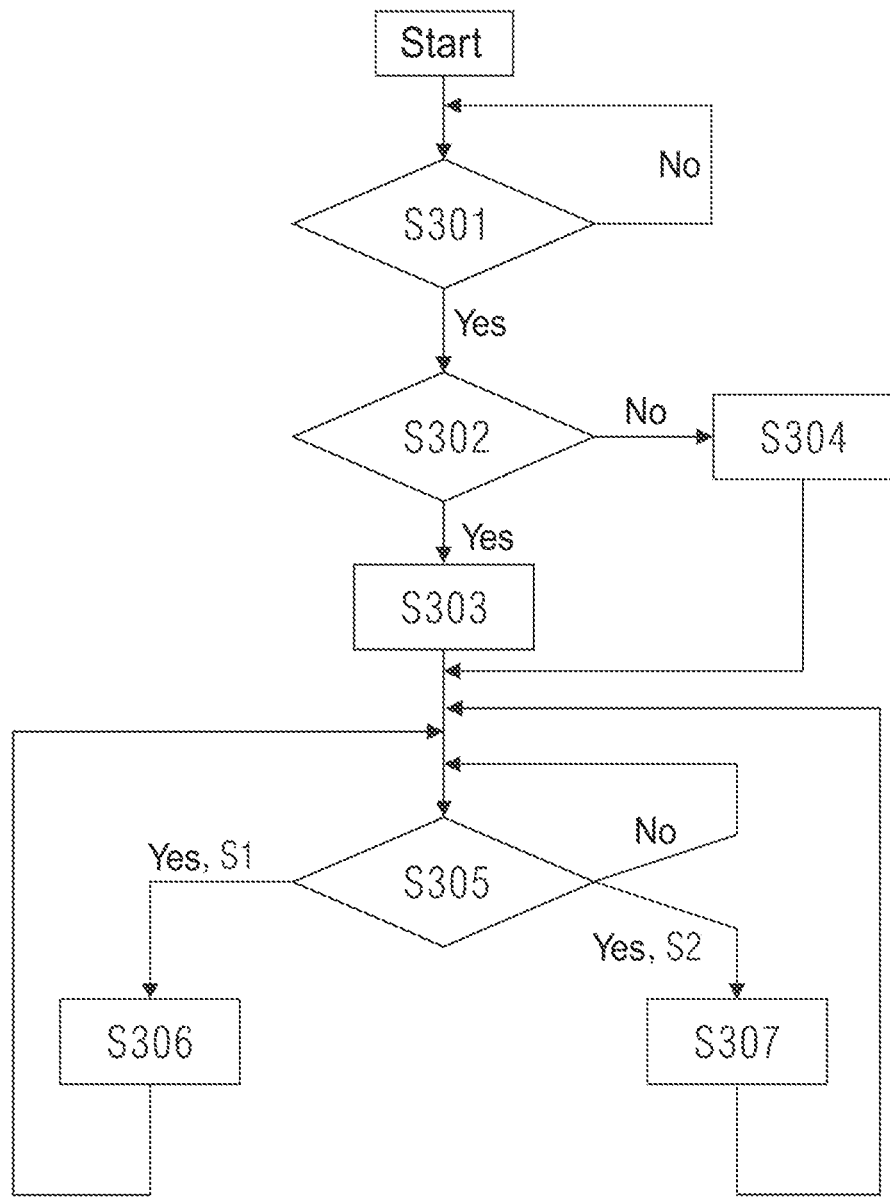
FIG. 3 illustrates a flowchart of operations of an apparatus for controlling light attributes of a lighting device according to embodiments of the present application.

Next, operations of the apparatus 100 for controlling light attributes of a lighting device according to embodiments of the present application will be described with reference to FIG. 3. FIG. 3 illustrates a flowchart of operations of an apparatus for controlling light attributes of a lighting device according to exemplary embodiments of the present application. As illustrated in FIG. 3, first, in step S301, it is determined whether the lighting device 200 or the control unit 120 is powered on. The lighting device 200 can be powered on in response to the external switch 111 being turned on, and the control unit 120 is powered on when the lighting device 200 is powered on. Upon determining that the lighting device 200 or the control unit 120 is powered on, the method proceeds to step S302, to start operations of the control unit 120. Alternatively, the control unit 120 may begin operation in response to being powered on. In step S302, the control unit 120 determines whether the lamp body switch is adjusted by the user in a power-off state in response to the lighting device 200 being powered on. If it is determined that the lamp body switch 112 is adjusted by the user in the power-off state, proceeds to step S303. In step S303, the lighting device is made to emit light according to a light attribute indicated by the adjusted lamp body switch 112. The light attribute is indicated by the second switching signal S2 outputted from the lamp body switch 112. If it is determined that the lamp body switch 112 is not adjusted by the user in the power-off state, proceeds to step S304. In step S304, the lighting device 200 is made to emit light according to a previous light-emitting light attribute of the lighting device stored in the memory 121. After steps S303 and S304, proceeds to step S305. In step S305, it is determined whether the external switch 111 or the lamp body switch 112 is adjusted by the user. Whether a corresponding switch is adjusted by the user can be determined according to whether the first switching signal S1 from the external switch 111 or the second switching signal S2 from the lamp body switch 112 is received. If it is determined that the external switch 111 is adjusted by the user (i.e., the control unit 120 receives the first switching signal S1), proceeds to step S306. In step S306, the current light attribute of the lighting device 200 is controlled to switch to another light attribute, different from the current light attribute, stored in the light attribute table (e.g., a next light attribute after the current light attribute). Alternatively, if it is determined in step S305 that the lamp body switch 112 is adjusted by the user (i.e., the control unit 120 receives the second switching signal S2), then proceed to step S307. In step S307, the current light attribute of the lighting device 200 is controlled to switch to a light attribute indicated by the second switching signal S2 from the lamp body switch 112. After steps S306 and S307, returns to step S305 to cyclically determine whether the external switch 111 or the lamp body switch 112 is adjusted by the user, until the lighting device 200 is powered off. If the lighting device 200 is powered off, the flow ends.

Next, the described operations of the apparatus 100 for controlling light attributes of a lighting device according to embodiments of the present application are described in more detail with reference to FIGS. 4 and 5.

Hereinabove, it is described that the apparatus 100 for controlling light attributes of a lighting device comprises a memory 121 for storing a previous light attribute setting of the lamp body switch 112, a previous light-emitting light attribute of the lighting device 200, and a light attribute table Tab1. In an exemplary embodiment, the memory 121 is included in the control unit 120. Next, a structural block diagram of a control unit according to exemplary embodiments of the present application will be described with reference to FIG. 4.

As shown in FIG. 4, the control unit 120 comprises a memory 121, an additional memory 122, and a processor 123. The memory 121 stores first storage information Inf1, second storage information Inf2, and the light attribute table Tab1. The first storage information Inf1 represents the previous light attribute setting of the lamp body switch 112. The second storage information Inf2 represents the previous light-emitting light attribute of the lighting device 200 which indicates the light attribute of light last emitted by the lighting device 200. The light attribute table Tab1 is a preset table in which a plurality of light attributes that can be presented by the lighting device 200 are sequentially recorded. FIG. 4 schematically illustrates n color temperatures CCT-1 to CCT-n, such as 3000K, 4000K, 5000K and 6500K that are sequentially recorded in the light attribute table Tab1, when the light attribute table Tab1 indicates color temperature (CCT). Alternatively, the light attribute table Tab1 may also sequentially record a plurality of different brightnesses, colors, beam angles, or color rendering indexes (CRI), etc. The additional memory 122 is configured to store program codes executable by the processor 123. When the control unit 120 is started, the processor 123 performs the operations described with reference to FIG. 3 by reading the program codes stored in the additional memory 122, reading the information recorded in the memory 121, and acquiring the switching signal from the external switch 111 or the lamp body switch 112.

In the exemplary embodiments of the present application, preferably, when a lighting system 300 comprising the apparatus 100 and the lighting device 200 is delivered, same default first storage information Inf1 and second storage information Inf2 are stored in the memory 121, and the default storage information corresponds to the light attribute setting on the lamp body switch 112 when delivered.

Further, in the embodiments of the present application, the control unit 120 switches light attribute of the lighting device 200 by instructing a driver of the lighting device 200 (e.g., by a controller of the lighting device 200) to change the magnitude of a drive current or a duty cycle of the drive current of at least one LED of the lighting device 200.

In exemplary embodiments of the present application, a single lighting device 200 comprises at least two LEDs. When the light attribute is color temperature, the at least two LEDs comprise a first LED configured to emit light at a first color temperature (for example, 3000K) and a second LED configured to emit light at a second color temperature (for example, 7000K) different from the first color temperature, thereby changing the overall color temperature of the lighting device 200 comprising the two LEDs by changing the drive current of the first LED and/or the second LED.

In exemplary embodiments of the present application, the light attributes comprise color temperature and brightness, and the lighting device 200 comprises a first LED configured to emit light at a first color temperature and a first brightness and a second LED configured to emit light at a second color temperature and a second brightness, wherein the first color temperature is different from the second color temperature, and the first brightness is different from the second brightness, so as to achieve adjustment of different color temperatures and brightnesses of the lighting device 200.

Preferably, the first color temperature is higher than the second color temperature, and the first brightness is higher than the second brightness. For example, the first color temperature is 2700 K and the first brightness is 100%, or 80% brightness; and the second color temperature is 2200 K and the second brightness is 50%, 20%, or 10% brightness. In this way, when only the first LED is lit or only the second LED is lit, the brightness is low when the color temperature is low, and the brightness is high when the color temperature is high, thereby being able to simulate the effect of an incandescent lamp. Likewise, the first color temperature may also be set to be higher than the second color temperature, and the first brightness can be set to be lower than the second brightness, so as to adjust the color temperature and the brightness.

In another exemplary embodiment of the present application, the light attributes comprise a plurality of color temperatures and a plurality of brightnesses, each color temperature corresponding to the plurality of brightnesses, and the plurality of brightnesses comprising a first brightness and a last brightness. Upon receiving the first switching signal S1 from the external switch 111, if a current brightness of the lighting device 200 is not the last brightness, the light attribute of the lighting device 200 is switched from a current color temperature and the current brightness to the current color temperature and a next brightness; or if the current brightness of the lighting device 200 is the last brightness, the light attribute of the lighting device 200 is switched from a current color temperature and the current brightness to a next color temperature and the first brightness. Upon receiving the second switching signal S2 from the lamp body switch 112, the light attribute of the lighting device 200 can be switched from the current color temperature and brightness to a color temperature and brightness indicated by the second switching signal S2, or can be operated similar to those described above, which are not described again herein.

For example, when the plurality of color temperatures comprise 2200K and 2700K, and the plurality of brightnesses comprise 100%, 50%, 20%, and 10% brightness (namely, the brightnesses are sorted from large to small), if the current light attribute of the lighting device 200 is 2200K and 100% brightness, when the user quickly "turns off/on" the external switch 111 once (at this time, the control unit 120 receives the first switching signal S1 from the external switch 111), the light attribute of the lighting device 200 is switched to 2200K and 50% brightness by the control unit 120; when the user quickly "turns off/on" the external switch 111 again, the light attribute of the lighting device 200 is switched to 2200K and 20% brightness; then when the user quickly "turns off/on" the external switch 111 again, the light attribute of the lighting device 200 is switched to 2200K and 10% brightness; then when the user quickly "turns off/on" the external switch 111 again, the light attribute of the lighting device 200 is switched to 2700K and 100% brightness, . . . , and so on. At this time, for example, the lighting device 200 may comprise a first LED configured to emit light at a first color temperature 2700K and brightnesses of 100%, 50%, 20% and 10%, and a second LED configured to emit light at a second color temperature 2200K and brightnesses of 100%, 50%, 20% and 10%.

An operation flowchart of the apparatus for controlling light attributes of a lighting device according to exemplary embodiments of the present application is described in more detail with reference to FIG. 5 by using the structure of the control unit 120 as shown in FIG. 4.

Figure 5:
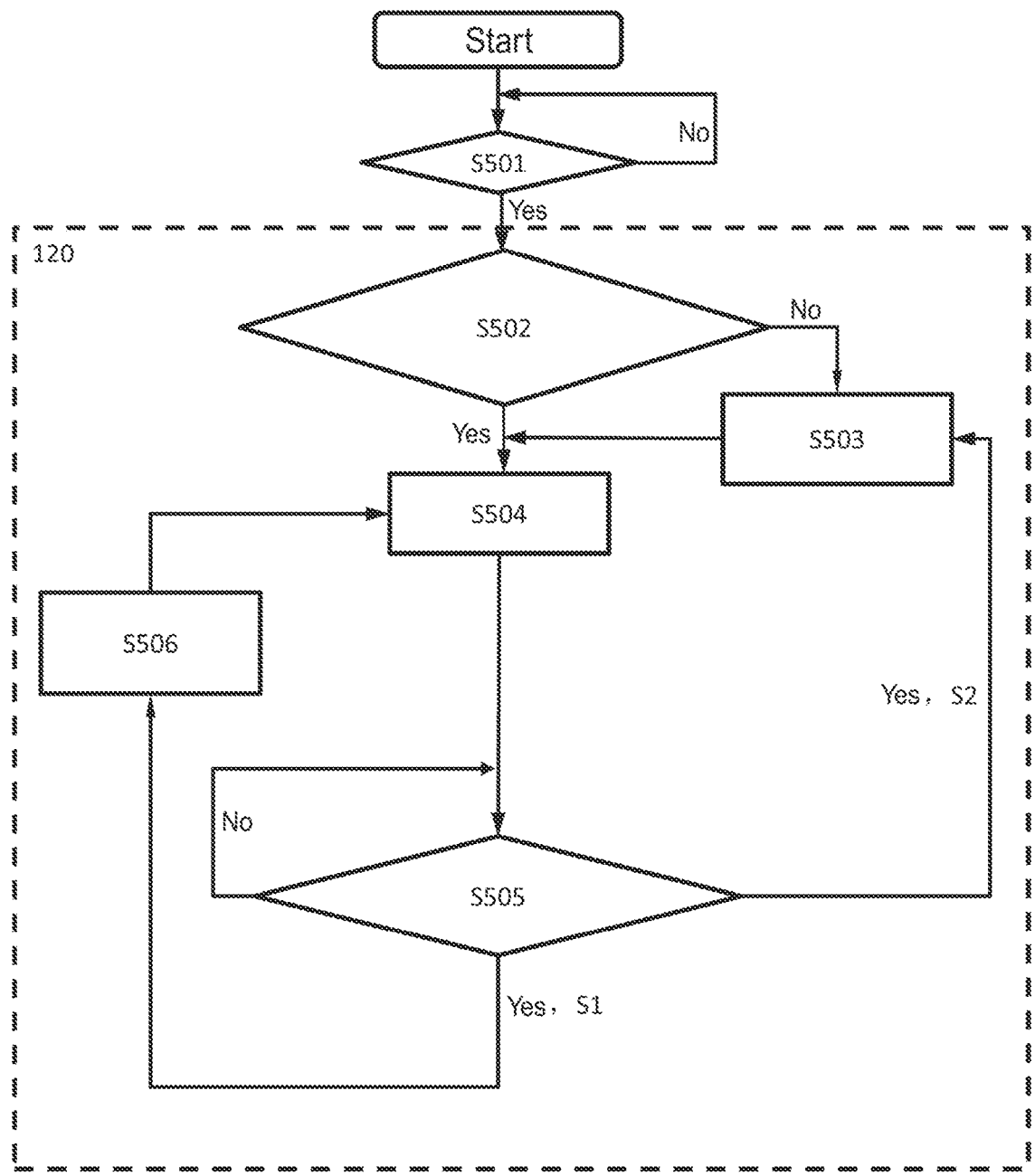
FIG. 5 illustrates a flowchart of operations of an apparatus for controlling light attributes of a lighting device according to exemplary embodiments of the present application.

As illustrated in FIG. 5, first, in step S501, it is determined whether the lighting device 200 or the control unit 120 is powered on. At this time, similar to the steps as shown in FIG. 3, the control unit 120 and the lighting device 200 may be powered on in response to the external switch 111 being turned on, and the method may automatically proceed to step S502 in response to powering on. In step S502, the control unit 120 acquires the current light attribute setting of the lamp body switch 112 in response to the lighting device 200 being powered on, and compares the current light attribute setting with a previous light attribute setting of the lamp body switch 112 indicated by the first storage information Inf1 stored in the memory 121, so as to determine whether the lamp body switch is adjusted by the user in a power-off state. If the current light attribute setting is not consistent with the previous light attribute setting, then it is determined that the lamp body switch is adjusted in the power-off state, and the method proceeds to step S503. In step S503, the stored first storage information Inf1 and second storage information Inf2 are updated with the current light attribute setting of the lamp body switch 112 (i.e., the light attribute indicated by the adjusted lamp body switch), and then the method proceeds to step S504. On the other hand, in step S502, if the current light attribute setting is consistent with the previous light attribute setting, it is determined that the lamp body switch is not adjusted in the power-off state, and the method proceeds to step S504. In step S504, the lighting device 200 is made to emit light according to the second storage information Inf2 (which indicates the previous light-emitting light attribute of the lighting device 200), and then the method proceeds to step S505. In step S505, it is determined whether the first switching signal S1 from the external switch 111 or the second switching signal S2 from the lamp body switch 112 is received. If it is determined that the first switching signal S1 is received, proceeds to step S506. In step S506, another light attribute (e.g., a next light attribute after the current light attribute) different from the current light attribute of the lighting device 200 is determined from the light attribute table Tab1, and the second storage information Inf2 is updated with the another light attribute. The current light attribute of the lighting device 200 is indicated by the current second storage information Inf2. For example, if the light attribute is color temperature and the current second storage information Inf2 indicates CCT-1 in the light attribute table Tab1, after the first switching signal S1 is received, the another light attribute may be determined as CCT-2, CCT-3, . . . , or CCT-n from the light attribute table Tab1 (specifically, the another light attribute depends on a preset light attribute switching interval regarding the first switching signal S1), and then the second storage information Inf2 is updated to be the another light attribute different from CCT-1. After step S506, returns to step S504, so that the lighting device 200 emits light according to the second storage information Inf2 (which has been updated to the another light attribute). On the other hand, if it is determined in step S505 that the second switching signal S2 is received, returns to step S503. In step S503, the first storage information Inf1 and the second storage information Inf2 are updated with the light attribute indicated by the second switching signal S2 (i.e., the current light attribute setting of the lamp body switch 112). Then, after step S503, proceeds to step S504.

In this way, during the light emission period after the lighting device 200 is powered on, the light attribute of the lighting device 200 can be sequentially switched according to the first switching signal S1 received from the external switch 111 or the second switching signal S2 received from the lamp body switch 112, until the lighting device 200 is powered off.

Correspondingly, the present application further provides a lighting system 300 (as shown in FIGS. 1 and 2) comprising the described apparatus 100 for controlling light attributes of a lighting device, and the lighting device 200. The lighting system 300 comprises the described apparatus 100 for controlling light attributes of a lighting device 200, and the lighting device 200, and can perform any of the operations described with reference to FIGS. 1 to 5.

It should be noted that the terms used herein are for the purpose of describing particular embodiments only and are not intended to limit exemplary embodiments in accordance with the present application. As used herein, the singular form is intended to comprise the plural form as well, unless the context clearly indicates otherwise, and further it should be understood that the terms "comprises" and/or "comprising" when used in the present description, specify the presence of features, steps, operations, devices, components and/or combinations thereof.

It should be noted that the terms "first", "second" etc., in the description, claims, and accompanying drawings of the present application are used to distinguish similar objects, and are not necessarily used to describe a specific sequence or order. It should be understood that the data so used may be interchanged where appropriate, so that the embodiments of the present application described herein can be implemented in sequences other than those illustrated or described herein.

The content above merely relates to preferred embodiments of the present application and is not intended to limit the present application. For a person skilled in the art, the present application may have various modifications and variations. Any modifications, equivalent replacements, improvements, etc. made within the spirit and principle of the present application shall all belong to the scope of protection of the present application.

The invention claimed is:

1. An apparatus for controlling light attributes of a lighting device, wherein the apparatus for controlling light attributes of the lighting device comprises:

an indicator configured to receive an input of a user, and send, to a control unit, a signal for switching light attribute of the lighting device;

wherein the control unit is configured to:

(i) determine whether a first switching signal or a second switching signal from the indicator is received during a light emission period after the lighting device is powered on, and if it is determined that the first switching signal is received, switch a current light attribute of the lighting device to another light attribute, different from the current light attribute, in a stored light attribute table, or if it is determined that the second switching signal is received, switch the current light attribute of the lighting device to a light attribute indicated by the second switching signal; and (ii) in response to the lighting device being powered on, determine whether the second switching signal is adjusted by the user in a power-off state;

and if it is determined that the second switching signal is not adjusted in the power-off state, make the lighting device emit light according to a stored previous light-emitting light attribute of the lighting device; or if it is determined that the second switching signal is adjusted in the power-off state, make the lighting device emit light according to a light attribute indicated by the adjusted second switching signal;

wherein when a specific light attribute is indicated by the second switching signal of the indicator, the light attribute of the lighting device is adjusted in accordance with the first switching signal of the indicator.

2. The apparatus for controlling light attributes of a lighting device according to claim 1, wherein the indicator comprises an external switch not located on a main body of the lighting device and a lamp body switch located on the main body of the lighting device, and wherein the first switching signal is outputted in response to an input of the user to the external switch, and the second switching signal is outputted in response to an input of the user to the lamp body switch.

3. The apparatus for controlling light attributes of a lighting device according to claim 1, wherein if it is determined that the first switching signal is received, switching a current light attribute of the lighting device to another light attribute, different from the current light attribute, in the stored light attribute table comprises:

in response to determining that the first switching signal is received, determining, from the stored light attribute table, another light attribute different from the current light attribute, updating a stored previous light-emitting light attribute of the lighting device with the other light attribute, and making the lighting device emit light according to the updated previous light-emitting light attribute.

4. The apparatus for controlling light attributes of a lighting device according to claim 2, wherein if it is determined that the second switching signal is received, switching the current light attribute of the lighting device to the light attribute indicated by the second switching signal comprises:

in response to determining that the second switching signal is received, determining the specific light attribute indicated by the second switching signal, updating a stored previous light attribute setting of the lamp body switch and a previous light-emitting light attribute of the lighting device with the light attribute indicated by the second switching signal, and making the lighting device emit light according to the updated previous light-emitting light attribute.

5. The apparatus for controlling light attributes of a lighting device according to claim 2, wherein the control unit is further configured to:

in response to the lighting device being powered on, determine whether the lamp body switch is adjusted by the user in a power-off state;

if it is determined that the lamp body switch is not adjusted in the power-off state, make the lighting device emit light according to a stored previous light-emitting light attribute of the lighting device; or if it is determined that the lamp body switch is adjusted in the power-off state, make the lighting device emit light according to a light attribute indicated by the adjusted lamp body switch.

6. The apparatus for controlling light attributes of a lighting device according to claim 5, wherein determining whether the lamp body switch is adjusted by the user in the power-off state comprises:

acquiring a current light attribute setting of the lamp body switch, comparing the current light attribute setting with a stored previous light attribute setting of the lamp body switch, and if the current light attribute setting is consistent with the previous light attribute setting, determining that the lamp body switch is not adjusted in the power-off state, or if the current light attribute setting is inconsistent with the previous light attribute setting, determining that the lamp body switch is adjusted in the power-off state.

7. The apparatus for controlling light attributes of a lighting device according to claim 5, wherein if it is determined that the lamp body switch is adjusted in the power-off state, making the lighting device emit light according to a light attribute indicated by the adjusted lamp body switch comprises:

updating a stored previous light attribute setting of the lamp body switch and a previous light-emitting light attribute of the lighting device with the light attribute indicated by the adjusted lamp body switch, and making the lighting device emit light according to the updated previous light-emitting light attribute.

8. The apparatus for controlling light attributes of a lighting device according to claim 2, wherein the apparatus for controlling light attributes of a lighting device further comprises:

a memory, configured to store a previous light attribute setting of the lamp body switch, a previous light-emitting light attribute of the lighting device and a light attribute table, wherein the light attribute table sequentially records a plurality of light attributes that can be presented by the lighting device.

9. The apparatus for controlling light attributes of a lighting device according to claim 2, wherein the external switch also controls an on/off of the lighting device, the external switch comprises a wall switch, a remote controller or a software application program, and the lamp body switch comprises a toggle switch, a touch switch, a key switch or a knob switch.

10. The apparatus for controlling light attributes of a lighting device according to claim 2, wherein the external switch is commonly used by a plurality of lighting devices, or the lighting device is controlled by a plurality of external switches.

11. The apparatus for controlling light attributes of a lighting device according to claim 1, wherein the light attributes comprise one or more of brightness, color temperature, color, beam angle, and color rendering index.

12. The apparatus for controlling light attributes of a lighting device according to claim 1, wherein the other light attribute different from the current light attribute is a light attribute several light attributes before or after the current light attribute in the stored light attribute table.

13. A lighting system, wherein the lighting system comprises:

the apparatus for controlling light attributes of a lighting device according to claim 1, and the lighting device, emitting light according to a light attribute controlled by the apparatus for controlling light attributes of the lighting device.

14. The lighting system according to claim 13, wherein the light attributes comprise color temperature and brightness, and the lighting device comprises a first LED configured to emit light at a first color temperature and a first brightness and a second LED configured to emit light at a second color temperature and a second brightness, wherein the first color temperature is different from the second color temperature, and the first brightness is different from the second brightness.

15. The lighting system according to claim 13, wherein the light attributes comprise a plurality of color temperatures and a plurality of brightnesses, each color temperature of the plurality of color temperatures corresponding to the plurality of brightnesses, and the plurality of brightnesses comprising a first brightness and a last brightness;

when the first switching signal or the second switching signal is received, if a current brightness of the lighting device is not the last brightness, the light attribute of the lighting device is switched from a current color temperature and the current brightness to the current color temperature and a next brightness; or if the current brightness of the lighting device is the last brightness, the light attribute of the lighting device is switched from a current color temperature and the current brightness to a next color temperature and the first brightness.

16. A method for controlling light attributes of a lighting device, wherein the light attribute of the lighting device can be switched in response to a switching signal of an indicator, and the method comprises:

(i) determining whether a first switching signal or a second switching signal from the indicator is received during a light emission period after the lighting device is powered on;

and if it is determined that the first switching signal is received, switching a current light attribute of the lighting device to another light attribute, different from the current light attribute, in a stored light attribute table, or if it is determined that the second switching signal is received, switching the current light attribute of the lighting device to a light attribute indicated by the second switching signal; and (ii) in response to the lighting device being powered on, determining whether the switching signal is adjusted by the user in a power-off state;

and if it is determined that the second switching signal is not adjusted in the power-off state, making the lighting device emit light according to a stored previous light-emitting light attribute of the lighting device; or if it is determined that the second switching signal is adjusted in the power-off state, making the lighting device emit light according to a light attribute indicated by the adjusted second switching signal;

wherein when a specific light attribute is indicated by the second switching signal of the indicator, the light attribute of the lighting device is adjusted in accordance with the first switching signal of the indicator.

17. The method for controlling light attributes of a lighting device according to claim 16, wherein if it is determined that the first switching signal is received, switching a current light attribute of the lighting device to another light attribute, different from the current light attribute, in the stored light attribute table comprises:

in response to determining that the first switching signal is received, determining, from the stored light attribute table, another light attribute different from the current light attribute, updating a stored previous light-emitting light attribute of the lighting device with the another light attribute, and making the lighting device emit light according to the updated previous light-emitting light attribute.

18. The method for controlling light attributes of a lighting device according to claim 16, wherein the indicator comprises an external switch not located on a main body of the lighting device and a lamp body switch located on the main body of the lighting device, and wherein the first switching signal is outputted in response to an input of a user to the external switch, and the second switching signal is outputted in response to an input of the user to the lamp body switch.

19. The method for controlling light attributes of a lighting device according to claim 18, wherein if it is determined that the second switching signal is received, switching the current light attribute of the lighting device to a light attribute indicated by the second switching signal comprises:

in response to determining that the second switching signal is received, determining the light attribute indicated by the second switching signal, updating a stored previous light attribute setting of the lamp body switch and a previous light-emitting light attribute of the lighting device with the light attribute indicated by the second switching signal, and making the lighting device emit light according to the updated previous light-emitting light attribute.

20. The method for controlling light attributes of a lighting device according to claim 18, wherein the method further comprises:

in response to the lighting device being powered on, determining whether the lamp body switch is adjusted by the user in a power-off state;

if it is determined that the lamp body switch is not adjusted in the power-off state, making the lighting device emit light according to a stored previous light-emitting light attribute of the lighting device; or if it is determined that the lamp body switch is adjusted in the power-off state, making the lighting device emit light according to a light attribute indicated by the adjusted lamp body switch.

21. The method for controlling light attributes of a lighting device according to claim 20, wherein determining whether the lamp body switch is adjusted by the user in the power-off state comprises:

acquiring a current light attribute setting of the lamp body switch, comparing the current light attribute setting with a stored previous light attribute setting of the lamp body switch, and if the current light attribute setting is consistent with the previous light attribute setting, determining that the lamp body switch is not adjusted in the power-off state, or if the current light attribute setting is inconsistent with the previous light attribute setting, determining that the lamp body switch is adjusted in the power-off state.

22. The method for controlling light attributes of a lighting device according to claim 20, wherein if it is determined that the lamp body switch is adjusted in the power-off state, making the lighting device emit light according to a light attribute indicated by the adjusted lamp body switch comprises:

updating a stored previous light attribute setting of the lamp body switch and a previous light-emitting light attribute of the lighting device with the light attribute indicated by the adjusted lamp body switch, and making the lighting device emit light according to the updated previous light-emitting light attribute.

23. A computer-readable storage medium with a program stored thereon which, when executed by an apparatus for controlling light attributes of a lighting device, causes the apparatus to execute the method for controlling light attributes of the lighting device according to claim 16.

\* \* \* \* \*